Aug. 7, 1923.
M. E. HANSON
VEHICLE WHEEL
Filed May 23, 1922
1,464,479
2 Sheets-Sheet 2
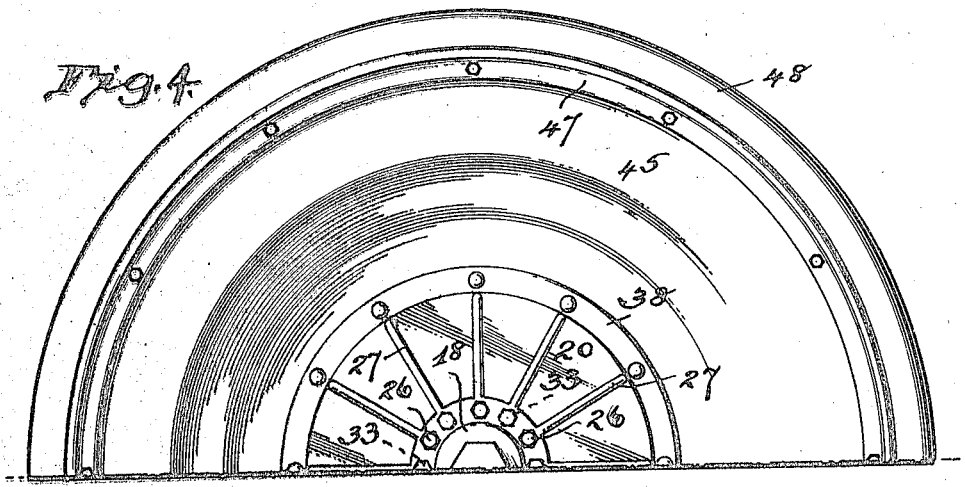
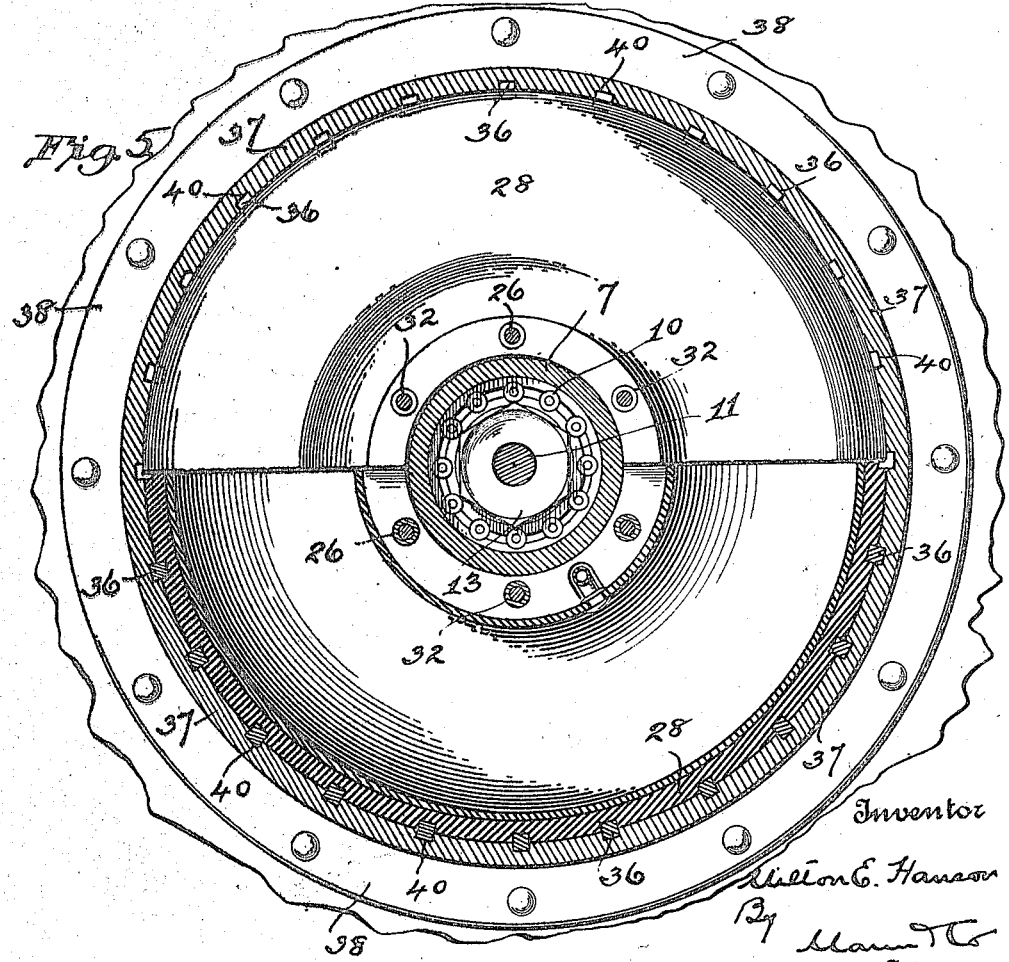
Inventor
Milton E. Hanson
By
Attorneys Patented Aug. 7, 1923.

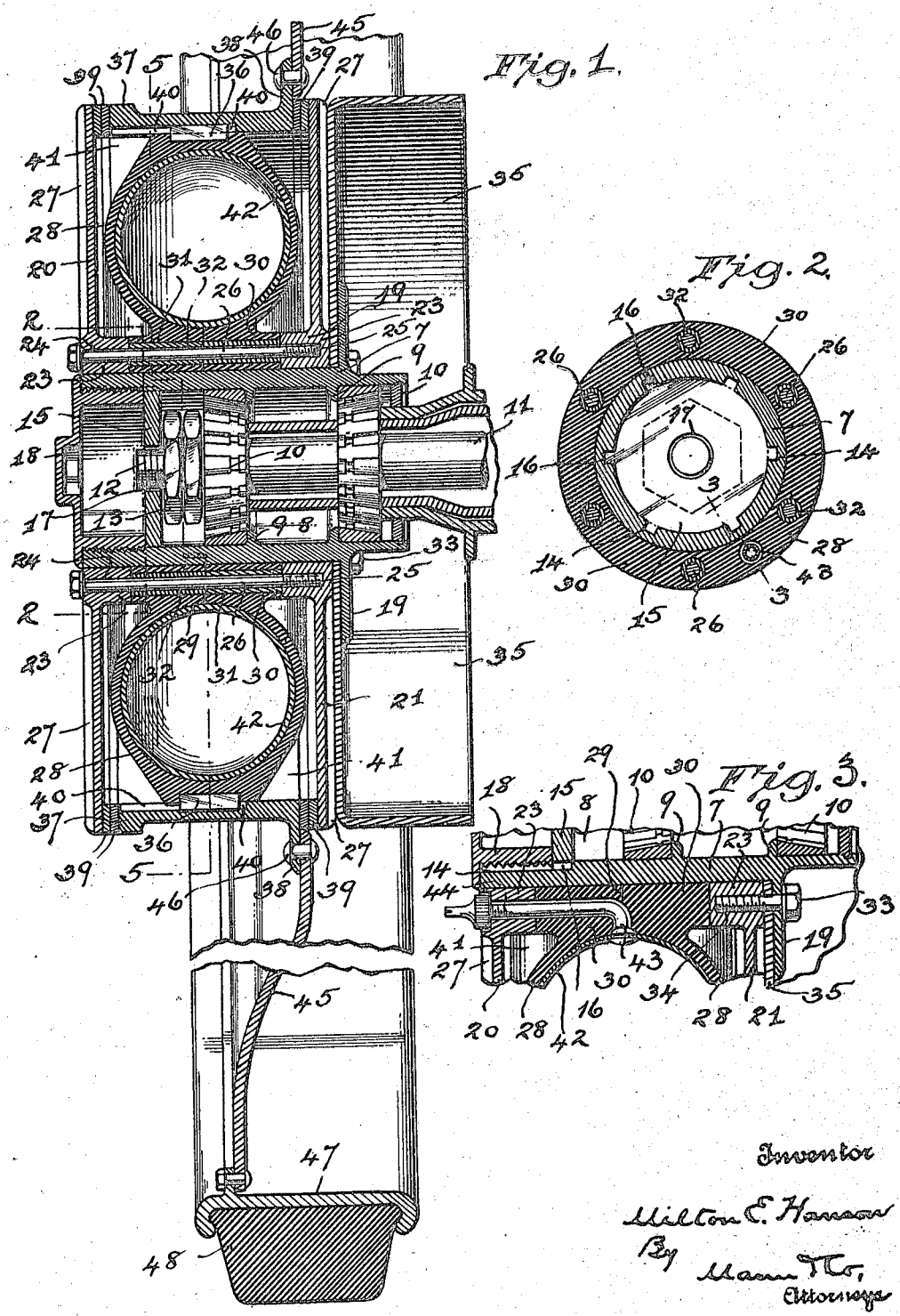

1,464,479

UNITED STATES PATENT OFFICE.

MILTON E. HANSON, OF BALTIMORE, MARYLAND, ASSIGNOR TO FLOYD W. JEFFERSON, TRUSTEE, OF SHORT HILLS, NEW JERSEY.

VEHICLE WHEEL.

Application filed May 23, 1922. Serial No. 562,940.

*To all whom it may concern:*

Be it known that MILTON E. HANSON, a citizen of the United States, residing at Baltimore, in the State of Maryland, has invented certain new and useful Improvements in Vehicle Wheels, of which the following is a specification.

This invention relates to improvements in vehicle wheels and is especially directed to that class of wheels wherein a cushion is provided around the hub.

The object of the invention is to provide an improved construction of hub structure and associated parts whereby to enclose the pneumatic cushioning means and to also provide an improved means for securing the wheel to the axle.

The invention is illustrated in the accompanying drawings, wherein,—

Fig. 1. shows a vertical sectional detail through the improved device.

Fig. 2. illustrates another sectional detail through the device,—the section being taken on the line 2—2 of Fig. 1.

Fig. 3. shows another sectional detail through the hub-structure,—the section being taken on the line 3—3 of Fig. 2.

Fig. 4. illustrates, in side elevation, one-half of the complete wheel, and

Fig. 5. shows a vertical sectional elevation through the wheel,—the section being taken on the line 5—5 of Fig. 1.

Referring to the drawings the numeral 7, designates an annular hub-sleeve with an interior chamber 8 having annular interior spaced apart shoulders 9, against which roller-bearings 10, seat.

These bearings are on the interior of and sustain the sleeve so the latter may revolve.

The axle 11, extends horizontally through the bearings and has an outer screw-threaded end 12, on which nuts 13 are screwed whereby to retain the parts in their operative relation.

The interior outer end of the sleeve 7 is provided with screw threads and this screw-threaded end also has a plurality of horizontally-extending key-ways or grooves 14 which latter extend for a short distance along the interior of the sleeve so that their inner ends will terminate in a vertical plane just beyond the outermost nut 13.

A guard disk or plate 15, is located in the sleeve at the outer side of the nuts 13 and this disk or plate is provided with a series of spaced-apart circumferential lugs 16 which latter register with and enter the key-ways or grooves 14 in the sleeve whereby to prevent independent rotation of the disk or plate with respect to the sleeve. This disk or plate is provided with a central hole 17, through which the end of the axle projects.

An internal plug-cap 18, screws into the outer end of the sleeve, its threads crossing the key-ways or grooves, and the inner end of this plug-cap seats against the outer side of the disk or plate 15, and holds the latter in rigid position immediately in front of the lock-nuts 13 and prevents the latter from working loose on the end of the axle.

Near the inner end, the sleeve has an annular flange 19 for a purpose that will presently be explained.

Around the hub-sleeve 7 I provide what I term front and back retaining plates 20 and 21 respectively.

These plates are substantially alike in construction and differ only in the arrangement of perforations for the passage of securing-bolts.

Each plate is circular in form and has a central opening 22, of a diameter to snugly fit over the exterior diameter of the hub-sleeve.

Around the central opening each plate has an annular boss or flange 23 projecting at its inner side and the boss of the front plate 20 is provided with a series of spaced-apart perforations 24 while the boss of the rear plate 21 has a series of spaced-apart internally threaded sockets 25.

The plates are so placed on the hub-sleeve 7 that the perforations 24 in the front plate will be in horizontal alinement with the threaded sockets 25 in the back plate so that long bolts 26 may be passed through the perforations 24 and extended horizontally back and screwed into the sockets 25 in the back-plate as clearly shown in Fig. 1 of the drawing.

The front and back plates extend in a vertical plane and provided with a series of radial webs or ribs 27 for the purpose of adding strength thereto.

Between the front and back plates 20 and 21 and extending annularly about the hub-sleeve 7 is located the pneumatic cushioning means.

This cushioning means includes what may be termed an outer casing or shoe 28 having a series of spaced apart lugs or projections around its outer circumference, which lugs or projections are rigidly attached to the shoe.

At the inner circumference the casing or shoe is split at 29 on an annular central line and at each side of this central split the casing is provided with annular enlargements 30 which snugly surround the hub-sleeve and have position between the inner bosses or flanges 23 on the front and back plates 20—21.

These enlargements 30 are provided with spaced apart and horizontally-extending perforations 31, and reinforcing tubes or sleeves 32 extend through the perforations 31 in the casing.

When the casing is in place around the hub-sleeve the tubes 32, in the enlargements of the casing will register with the perforations 24 in the front plate 20 and will also register with the sockets 25 in the rear plate 21 so that the bolts 26 may extend through the front plate then through the sleeves or tubes 32 and have their inner ends screwed into the sockets 25 in the rear plate.

By this means the enlarged ends of the casing will be clamped between the front and rear plates 20, 21 while the reinforcing sleeves or tubes 32, will act as spacers as well as reinforcements.

The plates 20 and 21 and the clamped casing 28 must also be secured with respect to the hub-sleeve 7 so all of those parts will positively turn together. To do this I provide a series of bolts 33, which pass through the flange 19 of the hub-sleeve 7 and screw into threaded sockets 34, provided in the annular boss or flange 23 on the rear plate 21, as clearly shown in Fig. 3 of the drawing.

In case the wheel is to carry a brake-drum 35, the latter will also be held to the hub-sleeve flange 19 by the said bolts 33.

It has been explained that the casing has a series of spaced-apart lugs or projections around its outer circumference which lugs or projections are rigidly attached to the casing.

By reference to Figs. 1 and 5 of the drawings these lugs and the parts with which they coact will now be explained.

The lugs 36 are equally spaced and are arranged all the way around the outer circumference of the casing as shown in Fig. 5 of the drawing.

Around the casing there is provided a drum or cylinder 37 which latter has an annular flange 38 at its inner side. This drum or cylinder has position between the front and rear plates 20 and 21, and suitable packing-rings 39 are interposed between the opposite faces of the drum and said front and rear plates.

The inner circumference of the drum is provided with a series of spaced-apart channels or grooves 40 which latter extend from the outer edge of the drum toward the inner edge thereof but terminate short of and are spaced from said inner edge, as can be seen in Fig. 1 of the drawing.

The distance between the several channels or grooves 40 is equal to the distance between the several lugs 36 so that when the casing is inserted in the drum the lugs 36 will be aligned with the grooves 40 and the lugs slide into the grooves as the casing is pushed into the annular chamber 41 which is formed between the drum and the hub-sleeve 7.

It will therefore be seen that when the casing is in place the lugs 36 at the outer circumference will be engaged by the grooves 40 in the drum and thus lock the two together against independent rotation while the casing will be held at its inner circumference by the bolts 26.

An inner tube 42, is provided on the interior of the casing 28 and by reference to Fig. 5, it will be seen that this tube may be inflated by means of a tubular stem 43 which extends laterally through the enlarged portion 30 of the casing and projects through a perforation 44, provided for it in the front plate 20.

In the present instance a disk or plate 45, is riveted at 46 to the flange 38 of the drum and this disk carries the rim 47 in which a tire 48 is held.

Having described my invention, I claim,—

1. In a vehicle wheel the combination with a hollow hub-shell, of a rear circular plate surrounding and detachably secured to the inner end of the hub-shell, a front circular plate surrounding the outer end of the hub-shell, a casing for a pneumatic tube encircling the hub-shell said casing having an annular split around its inner circumference with lateral enlargements at each side of the split, tubular reinforcements extending through said lateral enlargements, bolts extending through the front circular plate and passing through the tubular enlargements and screwing into the rear circular plate, a drum around the outer circumference of the casing and a wheel structure attached to the drum.

2. In a vehicle wheel the combination with a hollow hub-shell, of spaced apart circular plates around and attached to the shell, a casing for a pneumatic tube encircling the hub-shell between said plates said casing having a series of spaced-apart lugs projecting from its outer circumference and also having lateral side enlargements at its inner circumference, a drum encircling the casing said drum being provided around its inner circumference with a series of grooves extending from one side edge inwardly whereby the lugs on the casing may be slid into the grooves of the drum to lock the casing to the drum, bolts extending through one of the circular plates and entering the enlargements at the inner circumference of the casing, for securing the inner circumference of the casing to the hub-shell, and a wheel structure attached to the drum.

3. In a vehicle wheel the combination with a hub-shell, of a rear circular plate surrounding the shell and attached thereto, a front circular plate also surrounding the shell but spaced from the rear plate, a casing for a pneumatic tube encircling the hub-shell between said plates said casing having metal tubes extending horizontally therethrough adjacent its inner circumference, bolts passing through the front plate and extending through the metal tubes and entering the rear plate whereby to securely lock the front plate and casing to the rear plate,—the tubes serving as spacers between said plates, a drum about the outer circumference of the casing, means for locking the drum and casing together, and a wheel structure attached to the drum.

4. In a vehicle wheel the combination with a hollow hub-shell having a series of grooves extending inwardly from one end thereof, said grooved end being provided with screw-threads which cross the grooves therein, an axle entering the hub-shell, bearings in the shell between the axle and shell, nuts on the end of the axle at the outer end of the bearing, a guard plate having circumferential lugs to enter the grooves in the shell end, a plug cap screwed into the end of the shell and seating against said guard plate and a pneumatic structure about the hub-shell.

In testimony whereof I affix my signature.

MILTON E. HANSON.